Dec. 20, 1960 E. A. HANYSZ 2,965,188
VEHICLE CONTROL TRANSMITTER
Filed Nov. 10, 1958
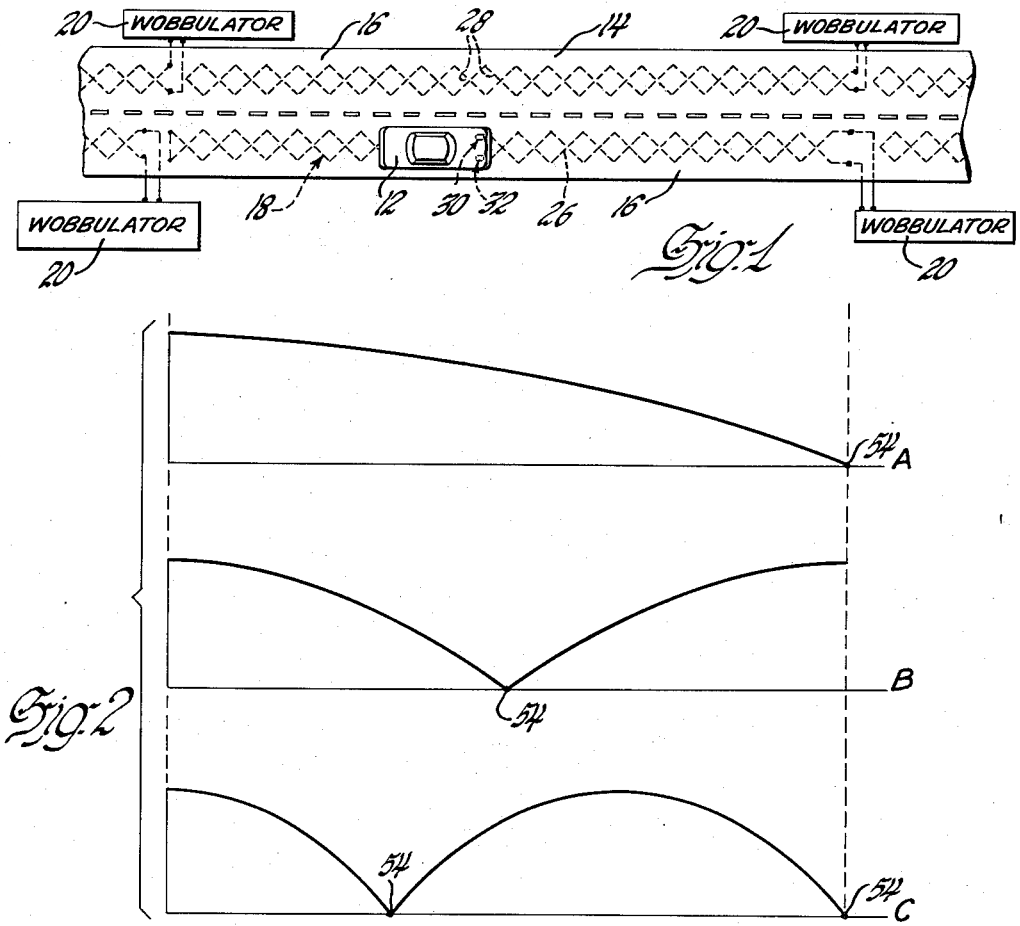
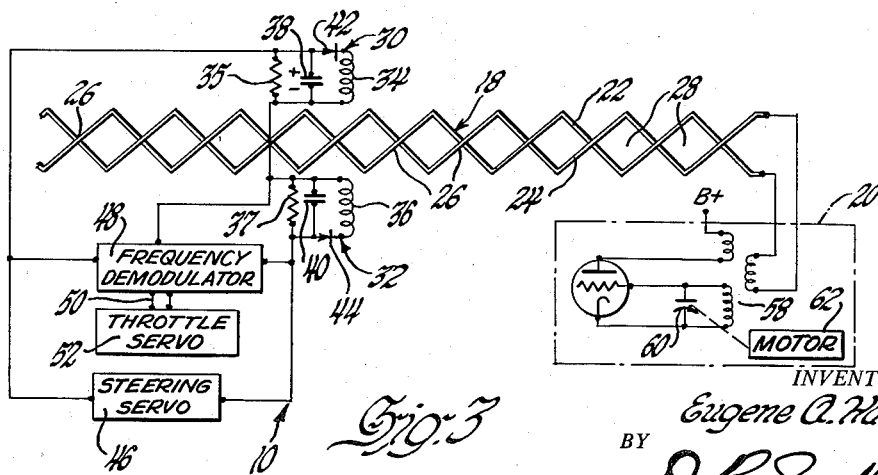
INVENTOR.
Eugene A. Hanysz
BY
D. R. Sadler
ATTORNEY

United States Patent Office 2,965,188
Patented Dec. 20, 1960

2,965,188

VEHICLE CONTROL TRANSMITTER

Eugene A. Hanysz, Royal Oak, Mich., assignor to General Motors Corporation, Detroit, Mich., a corporation of Delaware Filed Nov. 10, 1958, Ser. No. 772,933

6 Claims. (Cl. 180—82)

The present invention relates to automotive vehicles and, more particularly, to guidance systems for automatically controlling the operation of such vehicles.

At the present time automotive vehicles are normally completely controlled by the operator or driver and require his constant attention. Since driving for extended periods of time is a burden and the drivers frequently make disastrous mistakes, it has been proposed to provide means for automatically steering the vehicle along a predetermined path at a predetermined speed. In one system the roadway is subdivided into blocks and the information for controlling the vehicles is obtained from a guidance cable in each block that is buried beneath the surface of the road so as to radiate alternating electromagnetic fields thereabove. As the vehicle moves along the roadway, it senses the electromagnetic radiations and, as a result of the information contained therein, is directed along the roadway at a predetermined speed.

The field from each cable is created by an alternating electrical current that flows therethrough and is supplied by a suitable generator or oscillator. For numerous reasons, such as reducing the cost of the equipment, etc., it is desirable to employ long blocks and to space the generators as far apart as possible and to employ long lengths of control cables for each generator. However, even though the current in the cable may have a comparatively low frequecy, i.e., 20 kc. to 50 kc., desirable lengths of the control cables tend to approach and even exceed a quarter wave length of the frequency being employed. As a result, the current flow in the cable will be distributed in the form of a standing wave. Consequently, there will be null points in some portions of the cables where there is little or no current. Since the electromagnetic radiations are a function of current, the radiated field adjacent these portions will have little or no intensity. Accordingly, whenever a vehicle passes over a current null, it is unable to sense any signals from the cable.

It is proposed to provide a control system in which the guidance cable may have a length which is large compared to a quarter wave length of the frequency employed but will produce a strong guidance signal in all portions thereof. More particularly, this is to be accomplished by energizing the control cable by means of a variable frequency generator or "wobbulator" so that the cable will carry an alternating current having a frequency that varies between some predetermined maximum amount and some predetermined minimum amount. In the event the length of the cable is equal to or greater than a quarter wave length long and there are one or more resultant standing waves, any current nodal points will move lengthwise of the cables as the frequency of the current changes. Thus, although any given point on the cable may be the location of a current node, this condition will exist for only some limited portion of time, since the nodal point will move. Thus, during the remaining portions of time, there will be a current flowing therein at the former nodal point. Therefore, by varying the frequency at a sufficiently high rate, all portions of the cable will radiate a field of adequate strength to provide proper control of the vehicle.

In the drawings:

Figure 1 is a plan view of a roadway embodying the present invention and having an automatically controlled vehicle traveling therealong.

Figure 2 is a diagram of the type of standing current waves that occur in the control cable for such a system.

Figure 3 is a diagram of the system of Figure 1.

Referring to the drawings in more detail, the present invention is embodied in a control system 10, similar to that disclosed and claimed in copending application Serial No. 756,827, Vehicle Control System filed August 25, 1958, in the name of Garrard Mountjoy and assigned to the assignee of the present invention, for automatically controlling the operation of one or more automotive vehicles 12 traveling on a roadway 14.

In such a system 10 the roadway 14 is subdivided into a plurality of substantially identical blocks or sections 16. Each section 16 includes a control cable 18 that is buried beneath the surface of the roadway 14 so as to define the path the vehicles 12 are to follow. A separate variable frequency oscillator 20 is provided for each section 16 so as to supply an alternating current to the cable 18 for each section. Although the cable 18 may comprise a single conductor, in the present instance it includes a pair of electrical conductors 22 and 24 which are spaced from each other except at a plurality of equally spaced points 26 where they are crossed. Thus, the cable 18 will form a series of substantially identical loops 28 and any current therein will produce an alternating electromagnetic field that is radiated above the surface of the roadway 14 and consists of zones of maximum flux density separated by zones of little or no flux.

Any vehicles 12 equipped to be automatically controlled by the system 10 will have a pair of pickups 30 and 32 that are positioned on the vehicle 12 to straddle the cable 18 when the vehicle 12 is traveling along the path defined by the cable 18. Each of the present pickups 30 and 32 comprises an inductive coil 34 and 36 that is arranged to have an alternating electrical signal induced therein as a result of the alternating electromagnetic field. The strength of this signal will be a function of the distance between the coil 34 or 36 and the cable 18. Thus, if the vehicle 12 is symmetrically disposed over the cable 18, the coils 34 and 36 will be equally spaced from the cable 18 and the signals will be of equal amplitude. However, if the vehicle 12 is displaced from the cable 18, the spacing will be unequal and the coil closest to the cable 18 will have the stronger signal and the coil farthest away will be the weaker. It should be noted that the voltage induced in the coils 34 and 36 is a function of the flux density and, consequently, when the pickups pass from one loop 28, past a crossover point 26 and to the next loop, the induced voltage will vary from maximum to a minimum and back to the maximum. Thus, the voltage induced in the pickups 30 and 32 will be frequency modulated as a function of the vehicle speed and the spacing of the crossover points 26.

In order to utilize the information from the pickups 30 and 32 for controlling the vehicle, each coil 34 and 36 is serially interconnected with a condenser 38 and 40 and a rectifier 42 and 44 so that each condenser 38 and 40 will acquire a D.C. charge which will be a function of the amplitude of the signal induced in coils 34 and 36, respectively. Bleed resistors 35 and 37 may be placed across condensers 38 and 40 to form an R.C. circuit having a short time constant compared to the low frequency variations produced by the random displacements of the vehicle from the cable. The two condensers 38 and 40 are, in turn, connected in opposed relation with each other and the two charges tend to cancel each other. Thus, if both pickup coils 34 and 36 are equally spaced from the cable 18, the two charges will be equal and the total charge across both condensers 38 and 40 will be zero. However, if one pickup 30 or 32 moves toward the cable 18 and the other one moves away, the total charge will have a magnitude proportional to the amount of displacement and a polarity indicative of the direction.

The output of the two condensers 38 and 40 is interconnected with the inputs into a power steering servo 46 which is effective to position the dirigible wheels of the vehicle 12 so that the total charge will be reduced to a minimum or zero. In addition, one or both of the condensers 38 and 40 are connected to the input of a frequency demodulator 48 that will demodulate the frequency signal produced by the pickups 30 and 32 passing the crossover points 26. Thus, the output 50 of this demodulator 48 will be a function of speed of the vehicle 12. The demodulator 48 is, in turn, connected to the input of a throttle servo 52 which is effective to regulate the speed of the vehicle 12 to maintain the demodulator output constant. It will thus be seen that the vehicle 12 will be automatically controlled so as to travel over a predetermined path at a predetermined speed.

Although the coils 34 and 36 may have a voltage induced therein as a result of moving through a D.C. field, it is desirable for the current in the cable 18 to be an alternating one. Although the frequency may be of any desired amount, it has been found that a frequency above the audio range, i.e., 20 kc. to 50 kc., will not interfere with radio reception and will be subjected to a minimum amount of interference from other sources. These are comparatively low frequencies that do not require any unusual equipment to handle the signal. However, a quarter wave length will be approximately 2.4 miles to .9 mile, respectively, and, if the blocks or sections 16 have lengths that approach or exceed these distances, the lengths of the cables 18 will be comparable to a quarter wave length long. As a result, the current flow will be distributed in the form of a standing wave. Thus, there will be current nodes 54 on the cables 18 where little or no current is flowing. For example, in Figure 2A, the cable 18 is a quarter wave long and there is virtually no current at the input end of the cable. In the vicinity of these currents nodes 54, there will be little or no electromagnetic field radiated above the surface of the road 14. Consequently, the vehicle 12 will be unable to sense any form of command signal in these areas and the system 10 will temporarily lose control of the vehicle 12.

In order to eliminate the foregoing difficulties without decreasing the length of the cable 18 and/or reducing the frequency of the system 10, the generator 20 for supplying current to the cable 18 may be of the continuously varying frequency type or a so-called "wobbulator." The frequency of this generator 20 is made to vary between some predetermined minimum amount (for example, 20 kc.) and some predetermined maximum amount (for example, 50 kc.).

Although the generator 20 may be of any conventional design, in the present instance it comprises an oscillator having a tuned tank circuit 58 in which the resonant frequency is determined by a variable condenser 60. The capacitance of this condenser 60 is continuously varied by means of a suitable motor 62 that rotatably drives the condenser rotor. By causing the capacitance to vary in this manner between some predetermined limits, the frequency of the current in the cable 18 will vary over a corresponding range.

Thus, in the event the frequency has a wave length equal to four times the length of the cable 18, a standing wave similar to that in Figure 2A will occur in the cable. Under these circumstances, the current at the input end of the cable 18 will be substantially zero and there will be no electromagnetic field radiated above the roadway 14. However, since the frequency of the current is continuously changing, the current node 54 will not remain in the same location for any appreciable time, but instead, will appear to move along the cable 18. For example, when the frequency increases, the wave length will decrease and may eventually become equal to twice the length of the cable 18, as illustrated in Figure 2B. Under these circumstances, any current node 54 will be located in the middle of the cable 18 and the current at the input end will be a maximum. If the frequency continues to increase, the length of the cable may correspond to three-quarters of a wave length. Under these circumstances, the current distribution will correspond to that in Figure 2C, with a current node 54 at the input end and a similar node 54 a third of the length of the cable 18 from the opposite end. The frequency will then decrease and the wave length increase back to their other limit.

This sweeping of the frequency spectrum is repeated sufficiently fast to prevent any given portion of the cable 18 having a current node 54 for a sufficient time to permit the vehicle 12 to become out of control due to a lack of signal. In choosing the sweep rate, the rate at which the pickups pass over the crossover points 26 should be considered. This will facilitate the frequency demodulator 48 being able to discriminate between the speed signal and any fluctuations that may occur as a result of the movement of the current nodes.

It may, therefore, be seen that the length of the control cable 18 may be very large compared to one quarter wave length of the exciting signal and, although one or more current nodes 54 may appear on the cable 18, if the sweep rate is sufficiently high, this condition will not persist long enough for the vehicle 12 to stray from the cable 18. Consequently, the vehicle 12 will always remain completely controlled by the information derived from the signal radiated from the control cable 18, irrespective of the portion of the cable 18 the vehicle is following.

It is to be understood that, although the invention has been described with specific reference to a particular embodiment thereof, it is not to be so limited since changes and alterations therein may be made which are within the full intended scope of this invention as defined by the appended claims.

What is claimed is:

1. A guidance system for regulating a series of vehicles, said system including electrically conductive means extending along and defining the path said vehicles will travel, a generator interconnected with said means for continuously supplying electrical energy thereto whereby said means will radiate an alternating electromagnetic field therefrom for controlling said vehicle, and means associated with said generator for varying the frequency of said generator continuously between some predetermined maximum and some predetermined minimum.

2. A guidance system for regulating a series of vehicles traveling over a lane of a roadway, said system including an electrically conductive cable extending along the centerline of said lane in said roadway and defining the path said vehicles will travel, a variable frequency generator interconnected with said cable for continuously supplying an electrical current thereto whereby said cable will radiate an alternating electromagnetic field above the surface of said roadway for controlling said vehicle, the frequency of said generator continuously varying between some predetermined minimum and some predetermined maximum.

3. A guidance system for regulating a series of vehicles traveling over a lane of a roadway, said system including a variable frequency generator, an electrically conductive cable extending along the centerline of said lane in said roadway and defining the path said vehicles will travel, said cable being interconnected with the output of said generator at all time so as to be excited thereby and radiate an alternating electromagnetic field above the surface of said roadway for controlling said vehicle, means for continuously varying the frequency of said generator between some predetermined minimum and some predetermined maximum.

4. In a guidance system for regulating a series of vehicles traveling over a roadway wherein a generator continuously excites a cable that defines the path said vehicles will travel and has a frequency that will cause the occurrence of standing waves on said cable, the improvement comprising means for continuously varying the frequency of said generator between some predetermined maximum and some predetermined minimum whereby any null points in said standing waves will move along said cable.

5. In a system for transmitting information to moving objects, conductive means extending along the path of movement of said objects, electrical means connected to said conductive means and adapted to continuously excite said conductive means with an alternating electrical signal having a frequency such that the length of said conductive means is a substantial fraction of a wavelength of said alternating signal, and means connected to said electrical means for varying the frequency of said alternating electrical signal over a substantial range whereby standing waves existing on said conductive means due to said signal will move along said conductive means.

6. In a system for transmitting information to moving objects, conductive means extending along the path of movement of said objects, electrical means connected to said conductive means and adapted to continuously excite said conductive means with an alternating electrical signal having a frequency such that the length of said conductive means is a substantial fraction of a wavelength of said alternating signal, and means connected to said electrical means for varying the frequency of said alternating electrical signal over a substantial range at a predetermined frequency whereby standing waves existing on said conductive means due to said signal will move along said conductive means at a speed determined by said predetermined frequency, said speed being much greater than the rate of movement of said moving objects.

References Cited in the file of this patent

UNITED STATES PATENTS

| | | |
|---|---|---|
| 2,366,195 | Kandoian | Jan. 2, 1945 |
| 2,469,289 | Beard et al. | May 3, 1949 |
| 2,576,424 | Sunstein | Nov. 27, 1951 |
| 2,661,070 | Ferrill | Dec. 1, 1953 |
| 2,803,743 | Ballerait | Aug. 20, 1957 |
| 2,826,691 | Elliott | Mar. 11, 1958 |
| 2,835,858 | Moseley | May 20, 1958 |
| 2,847,080 | Zworykin et al. | Aug. 12, 1958 |

OTHER REFERENCES

Barrett Guide-O-Matic Operatorless Tractor, Bulletin No. 552–1, Barrett-Cravens Co., Northbrook, Ill.